United States Patent
Couchman et al.

(10) Patent No.: US 9,777,706 B2
(45) Date of Patent: Oct. 3, 2017

(54) WIND TURBINE TILT OPTIMIZATION AND CONTROL

(71) Applicant: MHI Vestas Offshore Wind A/S, Aarhus N (DK)

(72) Inventors: Ian Couchman, London (GB); Robert Bowyer, London (GB)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 321 days.

(21) Appl. No.: 14/417,211

(22) PCT Filed: Jul. 23, 2013

(86) PCT No.: PCT/DK2013/050249
§ 371 (c)(1),
(2) Date: Jan. 26, 2015

(87) PCT Pub. No.: WO2014/015878
PCT Pub. Date: Jan. 30, 2014

(65) Prior Publication Data
US 2015/0211484 A1    Jul. 30, 2015

Related U.S. Application Data

(60) Provisional application No. 61/675,883, filed on Jul. 26, 2012.

(30) Foreign Application Priority Data

Jul. 26, 2012    (DK) ................................ 2012 70453

(51) Int. Cl.
*F03D 7/02*    (2006.01)
*F03D 13/20*    (2016.01)
*F03D 7/04*    (2006.01)

(52) U.S. Cl.
CPC ........... *F03D 7/0204* (2013.01); *F03D 7/047* (2013.01); *F03D 13/20* (2016.05);
(Continued)

(58) Field of Classification Search
CPC . F03D 7/02; F03D 7/236; F03D 13/20; F03D 13/25
See application file for complete search history.

(56) References Cited

U.S. PATENT DOCUMENTS 4,342,539 A * 8/1982 Potter ...................... F03D 7/06
416/132 B
5,584,655 A * 12/1996 Deering ................ F03D 7/0224
290/44

(Continued)

FOREIGN PATENT DOCUMENTS

EP    2381100 A2    10/2011
EP    2472105 A2    7/2012
(Continued)

OTHER PUBLICATIONS

International Search Report for PCT/DK2013/050249, Oct. 15, 2013.
Danish Search Report for PA 2012 70453, Mar. 11, 2013.

*Primary Examiner* — Woody Lee, Jr.
*Assistant Examiner* — Topaz L Elliott
(74) *Attorney, Agent, or Firm* — Patterson + Sheridan, LLP

(57) ABSTRACT

The present invention relates to methods, controllers and computer program products for determining an optimal tilt angle for a wind turbine. One or more signals indicating site conditions at and/or near a wind turbine are received 402 and an optimal tilt angle for said wind turbine based on said received one or more signals indicating site conditions is determined 403. The optimal tilt angle is then transmitted
(Continued)

404 to a platform controller such that said wind turbine can be inclined said optimal tilt angle.

18 Claims, 4 Drawing Sheets

(52) U.S. Cl.
CPC ..... *F05B 2270/1095* (2013.01); *Y02E 10/721* (2013.01); *Y02E 10/723* (2013.01); *Y02E 10/728* (2013.01)

(56) References Cited

U.S. PATENT DOCUMENTS

| | | | |
|---|---|---|---|
| 6,619,918 B1* | 9/2003 | Rebsdorf | F03D 7/0224 416/1 |
| 8,053,916 B2* | 11/2011 | Edwards | F03B 13/142 290/42 |
| 8,109,722 B2* | 2/2012 | Gamble | F03D 1/0658 290/44 |
| 2004/0076518 A1 | 4/2004 | Drake | |
| 2006/0159550 A1* | 7/2006 | Nagao | F01D 1/30 416/132 B |
| 2010/0003134 A1 | 1/2010 | Edwards et al. | |
| 2012/0171034 A1 | 7/2012 | Gabeiras et al. | |
| 2014/0339828 A1* | 11/2014 | Peiffer | F03D 7/048 290/44 |
| 2016/0215759 A1* | 7/2016 | Fleming | F03D 7/046 |

FOREIGN PATENT DOCUMENTS

| | | |
|---|---|---|
| JP | 06288336 A | 10/1994 |
| JP | 2006200400 A | 8/2006 |
| JP | 2010168937 A | 8/2010 |
| WO | 2010/098814 A1 | 9/2010 |

* cited by examiner

WIND TURBINE TILT OPTIMIZATION AND CONTROL

The present invention relates to wind turbines and, in particular, to tilt optimization and control of a wind turbine.

Wind turbines effectively harness wind energy to generate electrical power and are becoming increasingly popular as an alternative energy source to the traditional sources for generating electrical power. Harnessing wind energy is considered to be a cleaner more sustainable source for the generation of electrical power.

In order to generate electrical power from wind energy, wind turbines 101 typically comprise a tower 102 that is based on a stable foundation 103, a nacelle 104 located on the tower 102 to house the electrical and mechanical apparatus, such as the generator, and a rotor 105 with one or more turbine blades 106 connected to the nacelle as shown in FIG. 1. In basic and simplistic terms, the turbine blades are rotated by the incident wind energy which drives a generator to produce electrical power.

Conventionally, wind turbines are designed with a rotor tilt angle of typically six degrees in the upwards direction, which in turn means that the turbine blades are effectively tilted upwards by six degrees. The tilt angle is defined as the tilt of the main shaft or nacelle from the horizontal or rotor plane. However, by having the rotor tilting upwards by six degrees the effective area for the incident wind on the turbine blades is also reduced which accordingly reduces the effective energy capture from the wind and reduces the electrical power output in partial load conditions.

Vertical wind shear can be a problem for wind turbines where the wind further from the ground is moving faster than the wind closer to the ground. Accordingly, in vertical wind shear conditions the turbine blade 106 pointing upwards is subject to greater wind speeds than the turbine blade 106 pointing downwards. Vertical wind shear can cause a pseudo-sinusoid shaped turbine blade root bending moment of a frequency 1P (1 per revolution) which can significantly contribute to the fatigue of the turbine blade. If the wind turbine includes three turbine blades 106 (as shown in FIG. 1) then the sum of the blade root moments will be 3P (3 per revolution) causing significant tilt and yaw moments on the main bearing of the wind turbine along with other components.

Conventionally, the effects of wind shear are reduced by the fixed six degree tilt angle of the rotor. The fixed tilt angle of the rotor means that the apparent wind speed for the turbine blade pointing upwards is reduced thereby reducing the amplitude of the pseudo-sinusoid turbine blade root bending moment.

The fixed tilt angle is designed to be the "best fit" across all wind speed and vertical wind shear conditions that wind turbines might experience around the world. However, the fixed tilt angle is not necessarily optimal for energy capture or for minimizing the turbine blade root moments and the tilt and yaw moments for each specific site at which the wind turbine is located or for weather patterns (e.g. seasonal patterns) that the wind turbine may be subject to.

Therefore, the present invention seeks to address, at least in part, some or all of the problems and disadvantages described hereinabove.

According to a first aspect of the present invention there is provided a method comprising the steps of: receiving one or more signals indicating site conditions at and/or near a wind turbine; determining an optimal tilt angle for the wind turbine based on the received one or more signals indicating site conditions; and transmitting the determined optimal tilt angle to a platform controller such that the wind turbine can be inclined the optimal tilt angle.

Accordingly an optimal tilt angle can be determined for a wind turbine based on the site conditions at or near the wind turbine. The optimal tilt angle may be an angle that enables the wind turbine to generate more electrical power in partial load and to minimize loads and moments on the wind turbine in full load and/or high vertical wind shear conditions.

The method may be implemented by a wind turbine controller, a Power Plant Controller (PPC), a Supervisory Control and Data Acquisition (SCADA) controller, independently or any combination thereof.

The one or more received signals indicating site conditions at and/or near the wind turbine may include one or more of vertical wind shear, wind speed, wind direction, wave conditions, weather forecasts, asymmetric loading, and yaw direction. The asymmetric loading signals may include turbine blade root bending moments or any other loads/moments signals.

The method may further comprise the steps of receiving one or more signals indicating operating points of the wind turbine; and determining the optimal tilt angle further based on the received one or more signals indicating operating points of the wind turbine.

The operating points may include one or more of an electrical power output, rotor speed, and pitch angle of one or more turbine blades of the wind turbine.

The method may further comprise the steps of identifying a sector in which a nacelle of the wind turbine is heading or facing or within; and determining the optimal tilt angle further based on the identified sector. The compass around the wind turbine is typically divided into 12 sectors of 30 degrees each.

The step of determining the optimal tilt angle may further include identifying the optimal angle from a lookup table. The determination via a lookup table may use as reference values for the lookup table one or more of the site conditions. The reference to the lookup table may further include one or more of the sector and the operating points.

The step of determining the optimal tilt angle may further comprise the steps of comparing the received one or more signals indicating site conditions at and/or near to the wind turbine with a predefined threshold; and if the received signal indicating site conditions at and/or near the wind turbine is greater than the predefined threshold then determine the optimal tilt angle as a tilt angle that brings the received signal indicating site conditions closer to or below the predefined threshold.

Accordingly, the determination may be based on a feedback control in order to be able to determine the optimal tilt angle for the wind turbine.

The signal indicating site conditions at or near the wind turbine for use in the feedback control may be the turbine blade root bending moment for one or more turbine blades. The signal indicating site conditions at or near the wind turbine for use in the feedback control may be the electrical power output of the wind turbine.

The method may further comprise the steps of receiving one or more signals relating to metocean data; and limiting the determined tilt angle based on the received one or more signals relating to metocean data. Accordingly, for floating wind turbines the tilt angle may be limited by the metocean data (e.g. wave forces, motions, etc.) in order to prevent the wind turbine from tilting too far in certain conditions which may affect the safety and cause a shutdown or the wind turbine to tip or fall over.

The method may further comprise the steps of optimizing the determination of the optimal tilt angle based on feedback control.

The method may further comprise the steps of converting the determined optimal tilt angle into a tilt and roll angle; and transmitting the tilt and roll angle to the platform controller. As the wind turbine may be facing or yawed to different directions the tilt angle may need to be converted into a tilt and roll angle for the platform. The conversion may be based on the yaw direction of the wind turbine.

According to a second aspect of the present invention there is provided a controller comprising: a first input adapted to receive one or more signals indicating site conditions at and/or near a wind turbine; a first processor adapted to determine an optimal tilt angle for the wind turbine based on the received one or more signals indicating site conditions; and a first output adapted to transmit the determined optimal tilt angle to a platform controller such that the wind turbine can be inclined the optimal tilt angle.

According to a third aspect of the present invention there is provided a controller adapted to: receive one or more signals indicating site conditions at and/or near a wind turbine; determine an optimal tilt angle for the wind turbine based on the received one or more signals indicating site conditions; and transmit the determined optimal tilt angle to a platform controller such that the wind turbine can be inclined the optimal tilt angle.

The controller may be by a wind turbine controller, a Power Plant Controller (PPC), a Supervisory Control and Data Acquisition (SCADA) controller, independently or any combination thereof.

The controller may further comprise a second input adapted to receive one or more signals indicating operating points of the wind turbine; and the first processor is further adapted to determine the optimal tilt angle further based on the received one or more signals indicating operating points of the wind turbine.

The controller may further comprise a second processor adapted to identify a sector in which a nacelle of the wind turbine is heading or facing or within; and the first processor is further adapted to determine the optimal tilt angle further based on the identified sector.

The first processor may be further adapted to identify the optimal angle from a lookup table.

The controller may further comprise a third processor adapted to compare the received one or more signals indicating site conditions at and/or near to the wind turbine with a predefined threshold; and if the received signal indicating site conditions at and/or near to the wind turbine is greater than the predefined threshold then the first processor is further adapted to determine the optimal tilt angle as a tilt angle that brings the received signal indicating site conditions closer to or below the predefined threshold.

The controller may further comprise a second input adapted to receive one or more signals relating to metocean data; and a fourth processor adapted to limit the determined tilt angle based on the received one or more signals relating to metocean data.

The controller may further comprise a fifth processor adapted to optimize the determination of the optimal tilt angle based on feedback control.

The controller may further comprise a sixth processor adapted to convert the determined optimal tilt angle into a tilt and roll angle; and a second output adapted to transmit the tilt and roll angle to the platform controller.

The first through sixth processors may be the same processor, different processor, or any combination thereof.

The first input and second input may be the same input or different inputs. The first output and second output may be the same output or different outputs.

The controller and components may be adapted by hardware, software or any combination thereof. The controller may be further adapted to implement any or all of the functions and features of the present invention.

According to a fourth aspect of the present invention there is provided a computer program product comprising computer readable executable code for: receiving one or more signals indicating site conditions at and/or near a wind turbine; determining an optimal tilt angle for the wind turbine based on the received one or more signals indicating site conditions; and transmitting the determined optimal tilt angle to a platform controller such that the wind turbine can be inclined the optimal tilt angle.

The computer program product may further comprise computer readable executable code for implementing any or all of the functions and features of the present invention.

Embodiments of the present invention will now be described, by way of example only, and with reference to the accompanying drawings in which.

As described hereinabove, the rotor of conventional wind turbines is fixed at an angle of six degrees from the vertical. However, by angling the rotor at six degrees, and thus the turbine blades, the effective area for the incident wind is reduced which in partial load conditions (e.g. wind speeds lower than the rated wind speed for the wind turbine) reduces the efficiency of the wind turbine.

Also, in full load (e.g. wind speeds at or above the rated wind speed for the wind turbine) and/or in high wind shear conditions the fixed rotor angle of six degrees reduces the effects of the pseudo-sinusoidal blade root bending moments but the moments may still build up causing a significant fatigue problem.

Figure 1:
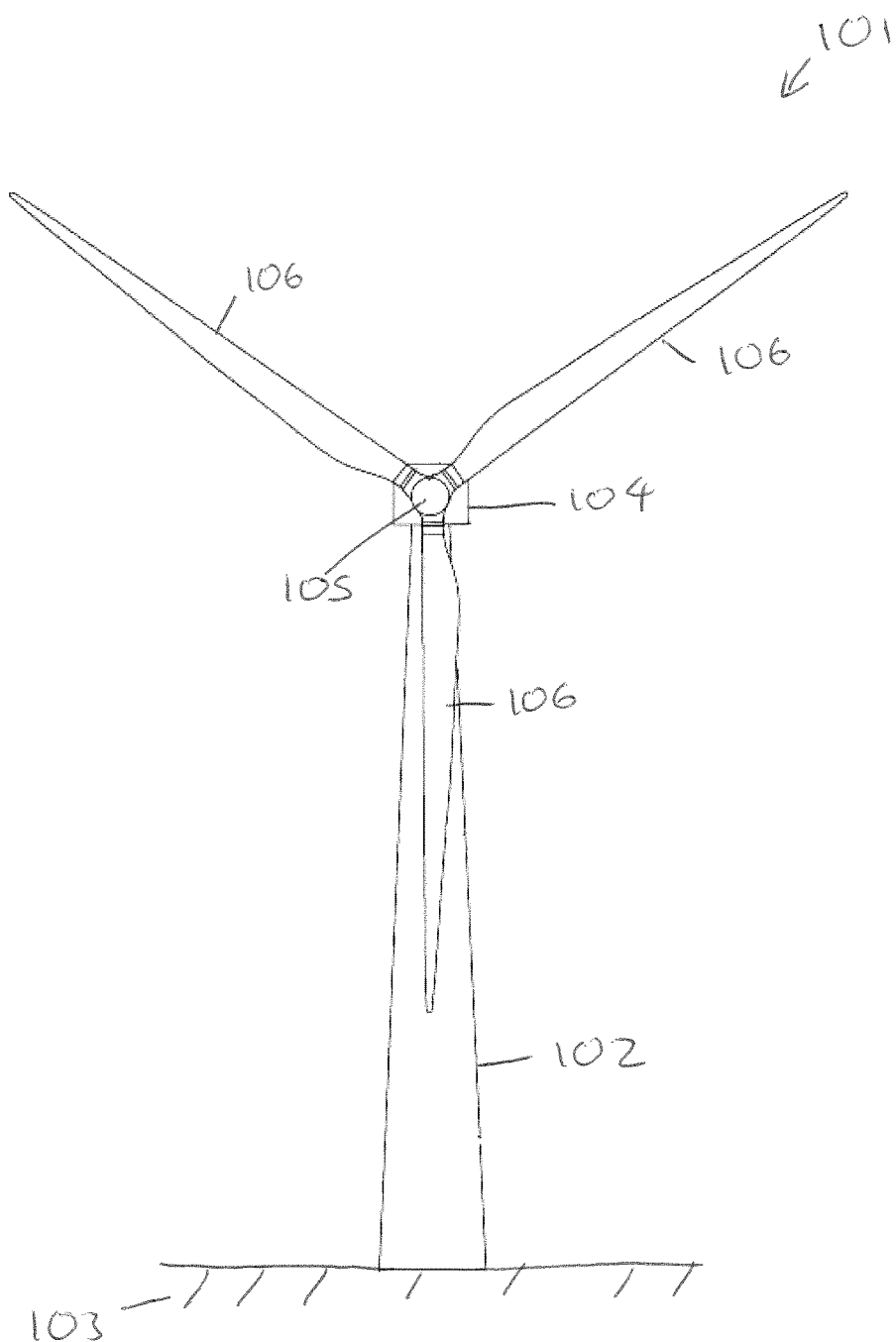
FIG. 1 shows a simplified schematic of a fixed onshore wind turbine.
Figure 2:
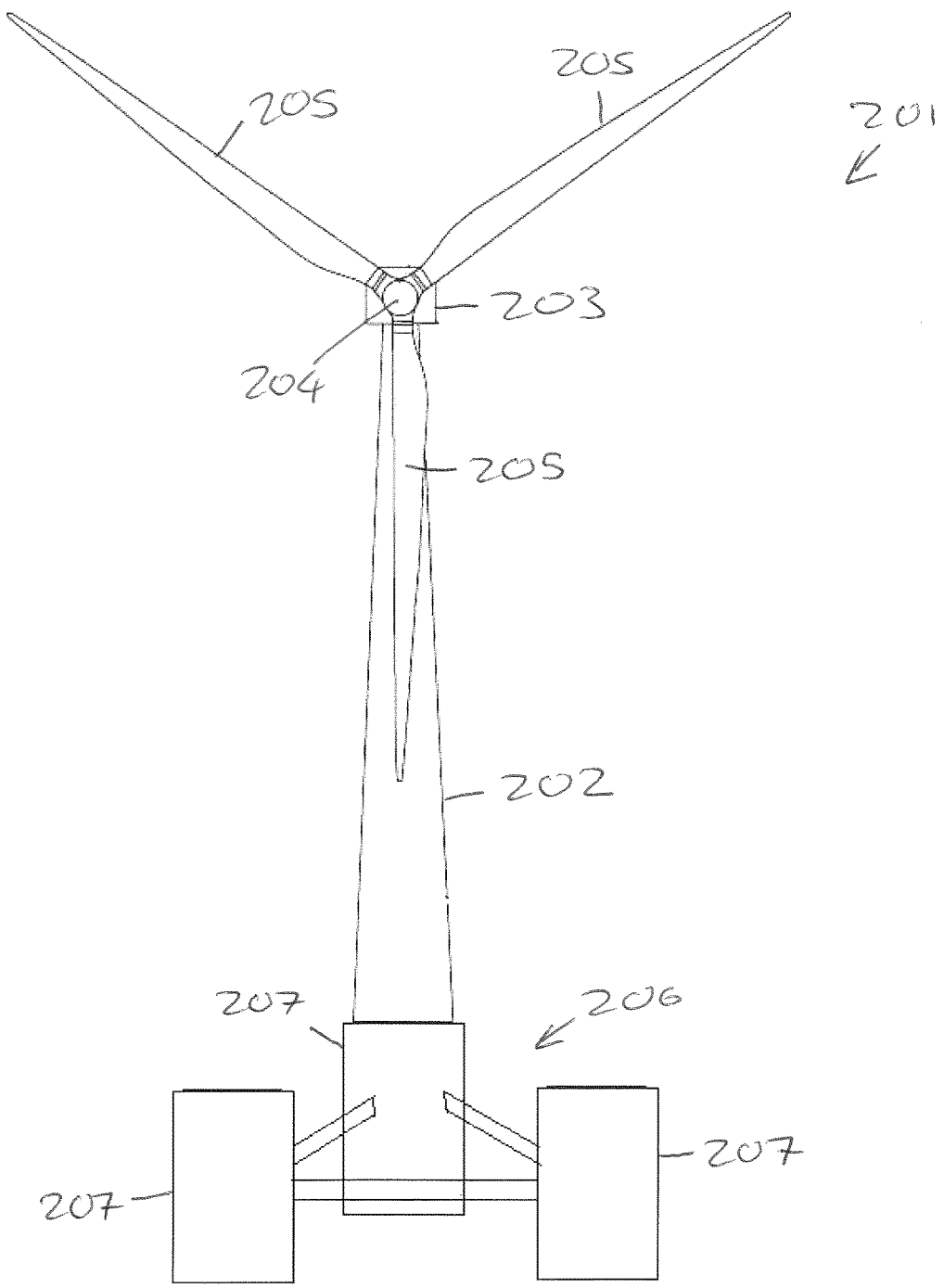
FIG. 2 shows a simplified schematic of an offshore floating wind turbine according to many of the embodiments of the present invention.

Offshore wind turbines which are mounted to a floating platform may include an active ballast system where ballast can be moved around the floating platform. The active ballast system is typically utilized to stabilize the wind turbine which will be subject to forces from the wind along with forces and motions from the water in which the wind turbine is floating. The floating platform may be activated or controlled to tilt and roll the wind turbine to counter the forces and motions acting on the floating wind turbine. One example of an offshore floating wind turbine is shown in FIG. 2. The floating wind turbine 201 includes a tower 202, nacelle 203, rotor 204, turbine blades 205 and a floating platform 206.

The floating platform 206 in this example is shown as having three ballast tanks 207 where ballast can be moved between the ballast tanks to stabilize the floating wind turbine. However, as will be appreciated, the floating platform 206 may be any type of floating platform, e.g. a buoy, which incorporates an active ballast system that can be altered to stabilize the wind turbine against the forces and motions acting on the floating wind turbine.

Figure 3:
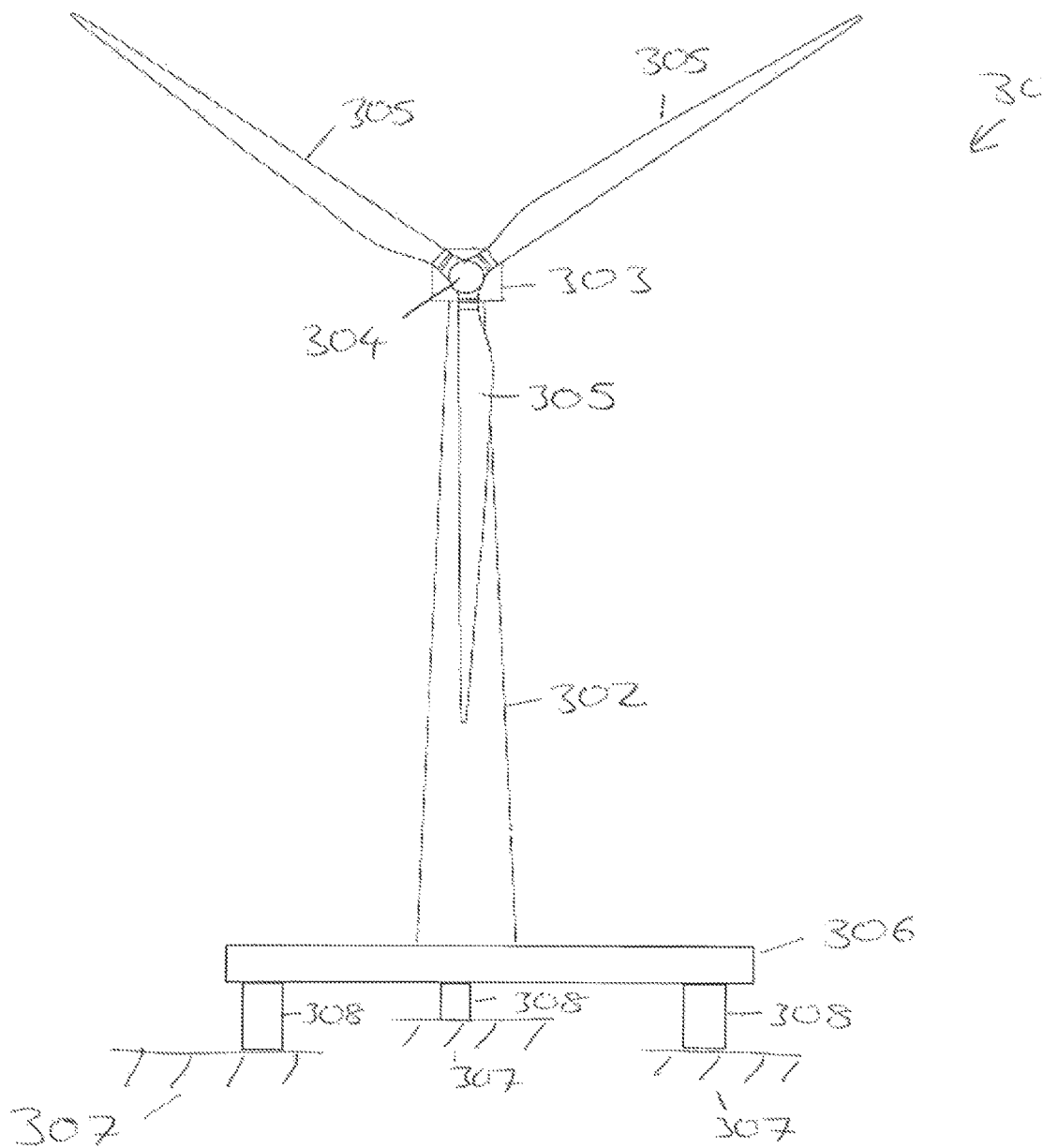
FIG. 3 shows a simplified schematic of an onshore wind turbine according to many of the embodiments of the present invention.

Onshore wind turbines are typically mounted on and fixed to solid foundations that support the wind turbine. In this embodiment, which is shown in FIG. 3, the onshore wind turbine 301 includes a tower 302, nacelle 303, rotor 304, turbine blades 305 and a platform 306 between the tower 302 and the foundations 307. The platform 306 may include an active system, such as a hydraulic system, where three hydraulic pistons 308 support the onshore wind turbine 301. The hydraulic pistons may be activated or controlled to tilt the onshore wind turbine 301.

The platform 306 in this example is shown as having three hydraulic pistons 308 where the pistons 308 can be operated to tilt the wind turbine 301 in multiple directions. However, as will be appreciated, the platform may be any type of platform that incorporates an active system that can be altered to tilt the wind turbine 301.

In the above examples shown in FIG. 2 and FIG. 3, the wind turbine is shown as a horizontal axis wind turbine but may be a vertical axis wind turbine. The wind turbine is also shown as having three turbine blades however, as will be appreciated the wind turbine may comprise one or more turbine blades. Also, in the above examples, the wind turbine is able to tilt in any direction around multiple axes as both the onshore platform and the offshore floating platform can be controlled by a platform controller to incline or tilt the wind turbine in any direction. However, as will be appreciated, the platform may be implemented such that it may only incline about one or more axes.

Figure 4:
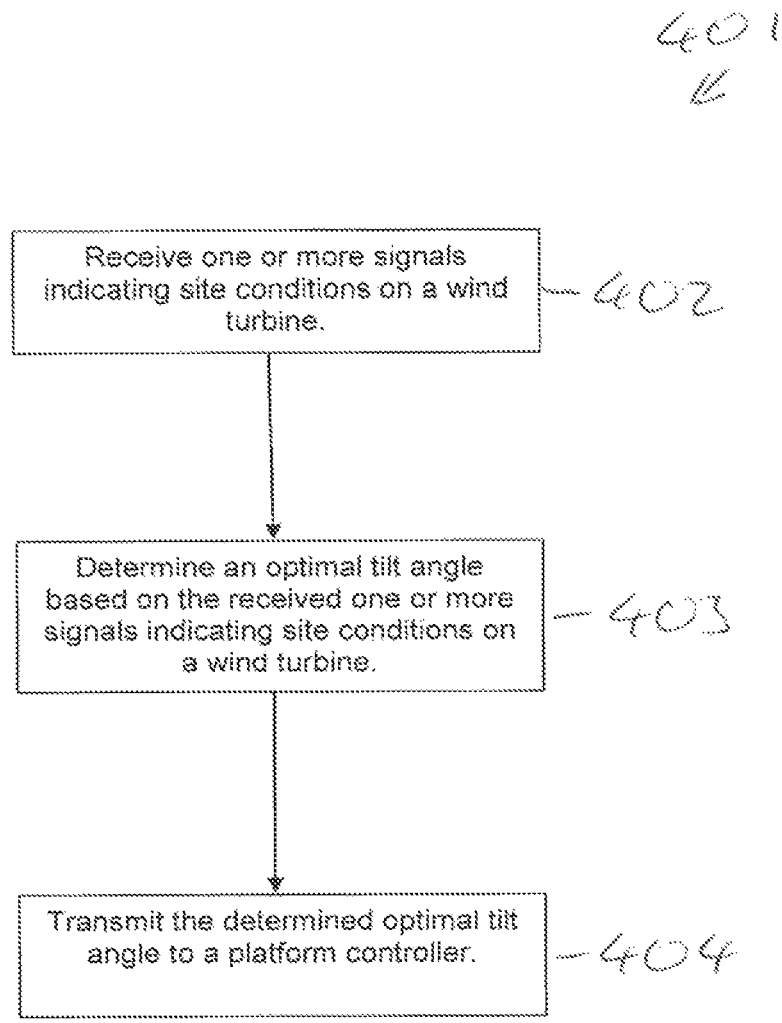
FIG. 4 shows a flow chart according to many of the embodiments of the present invention.

In the embodiments, the inclination or tilt angle of the wind turbine is actively controlled depending on the conditions affecting the wind turbine and will be described with reference to FIG. 4 which shows a flowchart 401.

In step 402 a controller, which may be a wind turbine controller, a Power Plant Controller (PPC), a Supervisory Control and Data Acquisition (SCADA) controller or any other controller, receives one or more signals indicating the site conditions at or near the wind turbine. The signals indicating the site conditions at or near the wind turbine may be one or more of a signal indicating vertical wind shear, wind direction, wind speed, weather forecasts, wave conditions or metocean data (for floating wind turbines), nacelle yaw direction, and asymmetric loads. The asymmetric loads may include one or more signals indicating the blade root bending moments and/or other loads on the wind turbine.

In step 403, the controller may determine the optimal tilt angle based on the received one or more signals indicating the site conditions at or near the wind turbine. The controller may determine the optimal tilt angle by computing the optimal tilt angle, referring to a lookup table, or any combination thereof.

In step 404 the controller may transmit the optimal tilt angle to a platform controller such that the platform controller can control the platform to incline the wind turbine to the required optimal tilt angle.

If the controller is a wind turbine controller then the wind turbine controller may interact directly with the platform controller to transmit the determined optimal tilt angle. If the controller is a PPC or SCADA controller then the optimal tilt angle may be transmitted directly to the platform controller via a wind turbine controller.

For a floating platform and for an onshore platform the optimal tilt angle determined may need to be converted into a tilt and roll angle. The optimal tilt angle may be converted into a tilt and roll angle based on the yaw direction of the nacelle of the wind turbine to be tilted. The tilt and roll angles may then be transmitted to the platform controller to activate the platform to the required angles. Alternatively, the optimal tilt angle and the current yaw position of the nacelle may be transmitted to the platform controller where the platform controller converts the optimal tilt angle to the required tilt and roll angles.

The controller may identify, based on, for example, one or more of the received signals indicating site conditions, or other operating points such as the current electrical power output of the wind turbine, the pitch angle of the turbine blades, the rotor speed, whether the wind turbine is in partial load, full load and whether the wind shear is high (e.g. above a predefined threshold).

In partial load and low wind shear conditions, the efficiency of the wind turbine may be increased by increasing the effective area of the turbine blades on which the wind is incident. In this case, based on the one or more signals indicating the site conditions at or near the wind turbine the controller determines the optimal tilt angle for the wind turbine. The optimal tilt angle may be computed by the controller in real time or may be identified from a lookup table using at least the received signals indicating the site conditions at or near the wind turbine as a reference for the lookup.

For example, if the received signals indicate that the wind shear is low and the wind turbine is in partial load, then the optimal tilt angle may be determined as six degrees in the positive direction (e.g. towards the wind) so that the greatest effective area of the turbine blades is reached by effectively cancelling out the fixed rotor angle. If negative wind shear occurs then the optimal tilt angle may be determined as greater than six degrees in the positive direction.

If the received signals indicate an increased wind shear, then the optimal angle may be determined as an angle less than six degrees so that the tilt of the wind turbine enables a greater effective area of the turbine blades whilst minimizing any moments on the components of the wind turbine due to the wind shear. Therefore, a lookup table may be created which identifies the optimum tilt angle in partial load for each wind shear and/or wind speed conditions.

The area or compass around the wind turbine may be divided into sectors. Typically there are 12 sectors of 30 degrees each defining the 360 degree compass around the wind turbine. The determination of the optimal tilt angle for a wind turbine may be further based on the sector in which the nacelle of the wind turbine is currently facing. Thus, the lookup table may include as a further reference the sector in order to determine or identify the optimal tilt angle for the wind turbine.

The optimal tilt angle determination may additionally or alternatively be further based on the estimated, current, or forecast operating points of the wind turbine. For example, the operating points may include one or more of the electrical power output, pitch angle of the turbine blades, rotor speed, idling conditions, maintenance operations, and so on. Therefore, the determination of the optimal tilt angle, either in real time or via a lookup table, may be further based on the operating points of the wind turbine. Under some operating points the optimal tilt angle may be set to 0 degrees effectively disabling the tilt optimization of the wind turbine.

The real-time calculations or the lookup table may be optimized where feedback control may be used to optimize the determination of the optimal tilt angle. For example, for a given tilt angle determined as the optimal tilt angle the electrical power output may be identified as being below the maximum that could be obtained and/or loads or not reduced to the minimum then the feedback may be used to update the determination of the optimal tilt angle.

The determination of the optimal tilt angle may be alternatively or additionally based on feedback control. For example, the electrical power output values may be used as feedback to determine the optimal tilt angle.

Accordingly, in partial load the wind turbine can be inclined such that the optimal energy capture from the wind can be achieved whilst minimizing the moments on the wind turbine for any given wind shear.

If the controller determines that the wind turbine is operating in full load, then the controller may determine the optimum tilt angle for the wind turbine based on the one or more signals indicating the site conditions at or near the wind turbine. The optimum tilt angle for the wind turbine in this case may be determined to reduce the moments on the wind turbine which reduces the fatigue of several components in the wind turbine. This is because in full load the wind turbine is subject to wind speeds at or above the rated wind speed for the wind turbine and is often subject to high wind shear.

The optimal tilt angle may be determined via a lookup table or via feedback control or any combination thereof. The lookup table mechanism may operate and be referenced in a similar manner to that described hereinabove in relation to the partial load conditions.

As also described hereinabove, vertical wind shear can cause a pseudo-sinusoidal turbine blade root moment of frequency 1P in each blade. In a wind turbine with three blades then the sum of the blade root moment gives 3P tilt and yaw moments. The turbine blade root bending moments may be measured by one or more sensors (e.g. strain gauges) on the turbine blades and may be provided to the controller as one of the signals indicating the asymmetrical loading on the wind turbine and therefore as one of the site conditions. The controller may therefore determine the optimal tilt angle for the wind turbine based on a feedback loop including the turbine blade root bending moment signal. In other words, the wind turbine may move or incline to the optimum tilt angle to reduce the amplitude of the pseudo-sinusoidal turbine blade root bending moment signal.

Accordingly, the controller may compare the pseudo-sinusoidal blade root bending moments with a predefined threshold (where the threshold may be a value, a signal, or a pattern) to determine whether the optimal tilt angle has been reached. If the sinusoidal blade root bending moments are greater than the predefined threshold then a new optimal tilt angle is determined to further reduce the difference between the sinusoidal blade root bending moments and the predefined threshold.

In full load and/or high wind shear conditions the optimal tilt angle may be several degrees away from the wind, e.g. in a negative direction, such that the wind turbine appears to be leaning or tilting backwards.

The controller may transmit the determined optimal tilt angle to the platform controller such that the platform controller may control or operate the platform to incline the wind turbine to the optimal angle. As described hereinabove, the optimal tilt angle may further be converted to a tilt and roll angle for the platform.

For an offshore wind turbine mounted on a floating platform with an active ballast system, the platform controller will typically regulate the platform to 0 degrees in order to maintain the stability of the wind turbine. However, the reference angle of 0 degrees may be altered to take a reference (e.g. the optimal tilt angle or the converted tilt and roll angles) from the controller (e.g. wind turbine controller, PPC, SCADA controller) thereby causing the floating platform to tilt the wind turbine to the required and optimal tilt angle.

As the floating platform is also subject to motion and forces from the water in which the floating platform is located, the system may further include a supervisor. The supervisor may receive metocean data and the determined optimal tilt angle and decide or identify whether it is safe to tilt the wind turbine in the current or future metocean conditions to the optimal tilt angle. The supervisor may limit the tilt angle of the wind turbine for safety reasons depending on the metocean conditions. Alternatively or additionally the metocean data may be fed into the calculations or lookup table for the determination of the optimal tilt angle.

Accordingly, in the embodiments and examples of the present invention, a floating wind turbine with an active ballast system or an onshore wind turbine mounted on a platform that can be actively moved, the controller may be able to control or initiate control over the inclination or tilt angle of the wind turbine. Therefore, advantageously the wind turbine can be inclined or tilted in order to effectively "overcome" the fixed rotor tilt angle problems.

The measurement or estimation of the vertical wind shear may be determined from MET mast data, from LiDAR devices or Laser Doppler Velocimeter (LDV) devices located at or separate to the wind turbine, other sensors, or from turbine load measurements, e.g. blade load sensors. The wind speed affecting the wind turbine may be inferred from turbine data (e.g. from the electrical power output of the wind turbine) or measured via other sensors such as a Light Detecting and Ranging (LiDAR) device, an anemometer, and the wind speed may be estimated or measured upstream of the wind turbine and/or at the wind turbine.

The lookup table that may be used to determine the optimal tilt angle may be computed offline or online. The lookup table may be updated using data or the signals indicating the asymmetrical loading of the wind turbine. For example, if for a given tilt angle the sinusoidal blade root moments are high, the lookup table may be updated to change the optimal tilt angle for the conditions.

The wind turbine controller, PPC and SCADA controller may implement the embodiments independently or may split the control of the embodiments between two or more of the controllers.

The frequency at which the optimal tilt angle is determined may be any suitable frequency for the purpose of the invention. For example, for determining the optimal tilt angle via a lookup table, the process may be performed every 10 minutes, or any other suitable frequency. In the case that the optimum tilt angle is determined via feedback control the signals may be sampled every 30 seconds, 1 minute to determine the optimal tilt angle.

Accordingly, the embodiments of the present invention describe mechanisms to determine an optimal tilt angle for a wind turbine where the optimal tilt angle advantageously enables an increased power capture from the wind in partial load conditions and to decrease loads on the tower during full load conditions.

While embodiments of the invention have been shown and described, it will be understood that such embodiments are described by way of example only. Numerous variations, changes and substitutions will occur to those skilled in the art without departing from the scope of the present invention as defined by the appended claims. Accordingly, it is intended that the following claims cover all such variations or equivalents as fall within the spirit and the scope of the invention.

What is claimed is:

1. A computer-implemented method comprising:
receiving one or more signals indicating site conditions at and/or near a wind turbine;
determining, via one or more processors, an optimal tilt angle for said wind turbine based on said received one or more signals indicating site conditions;
converting, via the one or more processors, said determined optimal tilt angle into a tilt and roll angle; and
transmitting said determined tilt and roll angle to a platform controller such that a platform, on which said wind turbine is mounted, is inclined to said tilt and roll angle.

2. The method as claimed in claim 1 in which said one or more received signals indicating site conditions at and/or near said wind turbine includes one or more of signals indicating vertical wind shear, wind speed, wind direction, wave conditions, weather forecasts, asymmetric loading, and yaw direction.

3. The method as claimed in claim 1 further comprising:
receiving one or more signals indicating operating points of said wind turbine; and
determining said optimal tilt angle further based on said received one or more signals indicating operating points of said wind turbine.

4. The method as claimed in claim 3 in which said operating points include one or more of an electrical power output, rotor speed, and pitch angle of one or more turbine blades of said wind turbine.

5. The method as claimed in claim 1 further comprising:
identifying a sector in which a nacelle of said wind turbine is facing; and
determining said optimal tilt angle further based on said identified sector.

6. The method as claimed in claim 1 in which said step of determining said optimal tilt angle includes identifying said optimal angle from a lookup table.

7. The method as claimed in claim 1 in which said step of determining said optimal tilt angle comprises:
comparing at least one of said received signals indicating site conditions at and/or near to said wind turbine with a predefined threshold; and
if said at least one of said received signals indicating site conditions at and/or near to said wind turbine is greater than said predefined threshold, then determining said optimal tilt angle as a tilt angle that brings said at least one of said received signals indicating site conditions closer to or below said predefined threshold.

8. The method as claimed in claim 7 in which said received one or more signals indicating site conditions at and/or near said wind turbine includes a signal indicating one or more turbine blade root bending moments for one or more turbine blades.

9. The method as claimed in claim 1 further comprising:
receiving one or more signals relating to metocean data; and
limiting said determined tilt angle based on said received one or more signals relating to metocean data.

10. The method as claimed in claim 1 further comprising:
optimizing said determination of said optimal tilt angle based on feedback control.

11. A controller comprising:
a first input adapted to receive one or more signals indicating site conditions at and/or near a wind turbine;
a first processor adapted to determine an optimal tilt angle for said wind turbine based on said received one or more signals indicating site conditions;
a second processor adapted to convert said determined optimal tilt angle into a tilt and roll angle; and
a first output adapted to transmit said determined tilt and roll angle to a platform controller such that a platform, on which said wind turbine is mounted, is inclined to said tilt and roll angle.

12. The controller as claimed in claim 11 further comprising:
a second input adapted to receive one or more signals indicating operating points of said wind turbine; and
said first processor is further adapted to determine said optimal tilt angle further based on said received one or more signals indicating operating points of said wind turbine.

13. The controller as claimed in claim 11 further comprising:
a third processor adapted to identify a sector in which a nacelle of said wind turbine is facing; and
said first processor is further adapted to determine said optimal tilt angle further based on said identified sector.

14. The controller as claimed in claim 11 in which said first processor is further adapted to identify said optimal angle from a lookup table.

15. The controller as claimed in claim 11 further comprising:
a fourth processor adapted to compare at least one of said received signals indicating site conditions at and/or near to said wind turbine with a predefined threshold; and
if said at least one of said received signals indicating site conditions at and/or near to said wind turbine is greater than said predefined threshold, then said first processor is further adapted to determine said optimal tilt angle as a tilt angle that brings said at least one of said received signals indicating site conditions closer to or below said predefined threshold.

16. The controller as claimed in claim 11 further comprising:
a second input adapted to receive one or more signals relating to metocean data; and
a fifth processor adapted to limit said determined tilt angle based on said received one or more signals relating to metocean data.

17. The controller as claimed in claim 11 further comprising:
a sixth processor adapted to optimize said determination of said optimal tilt angle based on feedback control.

18. A non-transitory computer program product storing a program, which, when executed by a processor performs operations comprising:
receiving one or more signals indicating site conditions at and/or near a wind turbine;
determining an optimal tilt angle for said wind turbine based on said received one or more signals indicating site conditions;
converting said determined optimal tilt angle into a tilt and roll angle; and
transmitting said determined tilt and roll angle to a platform controller such that a platform, on which said wind turbine is mounted, is inclined to said tilt and roll angle.

* * * * *